May 1, 1956     A. C. PETERSON     2,743,885
ROTOR AND WING AIRCRAFT

Filed May 7, 1953     4 Sheets-Sheet 1

INVENTOR.
Adolph C. Peterson.

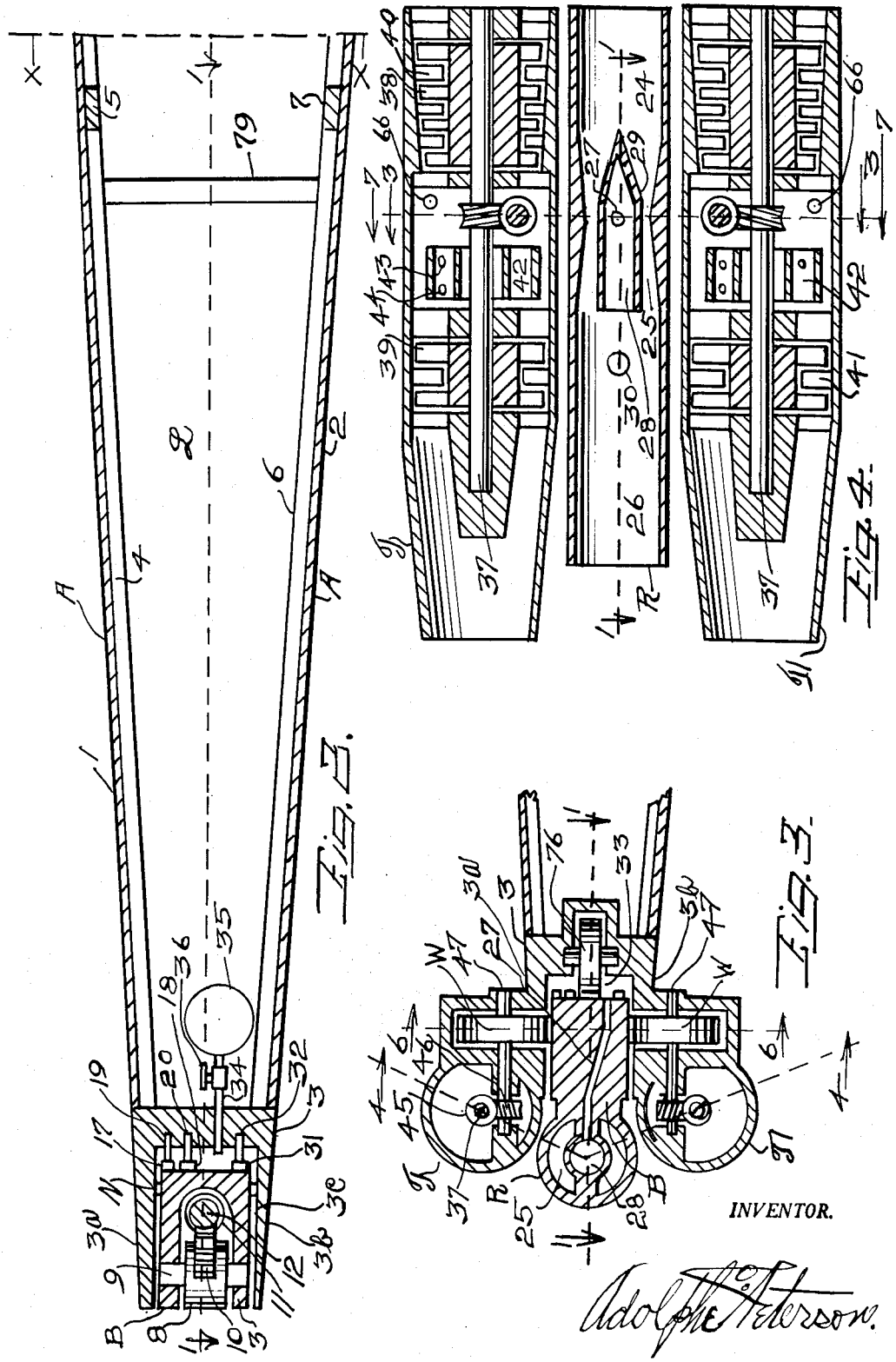

May 1, 1956 A. C. PETERSON 2,743,885
ROTOR AND WING AIRCRAFT
Filed May 7, 1953 4 Sheets-Sheet 3
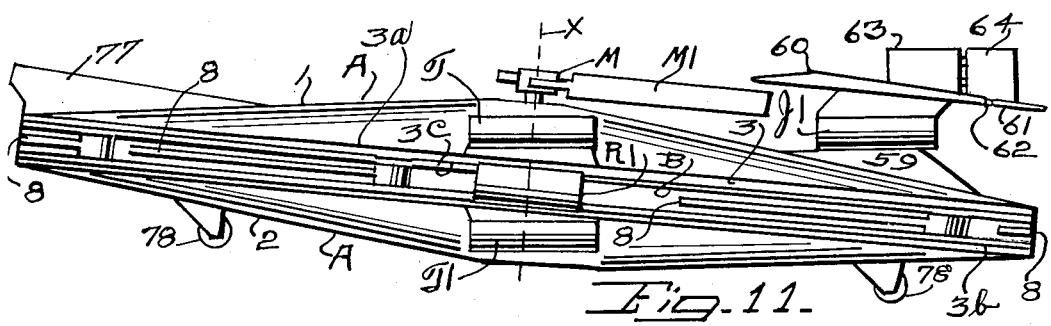
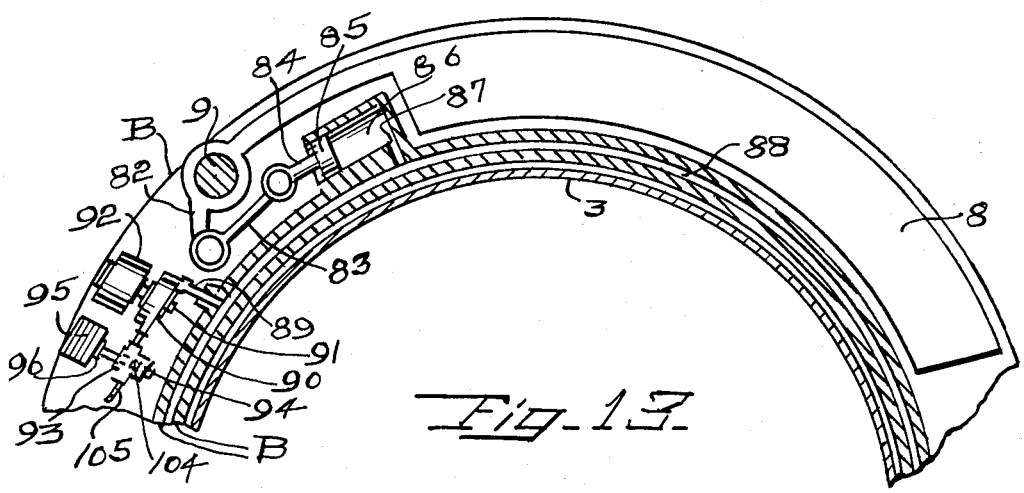
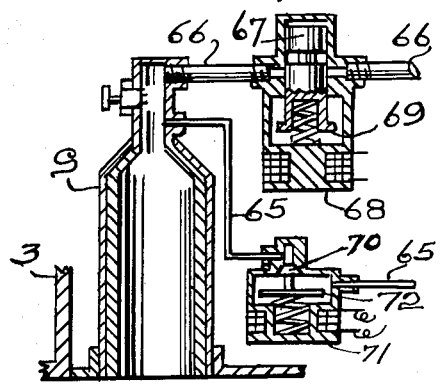
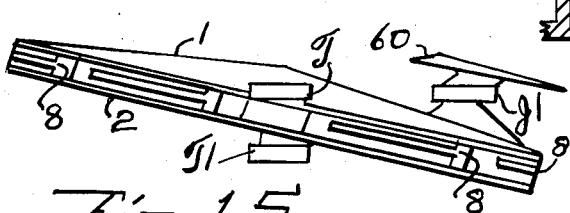
INVENTOR.
Adolphe Peterson

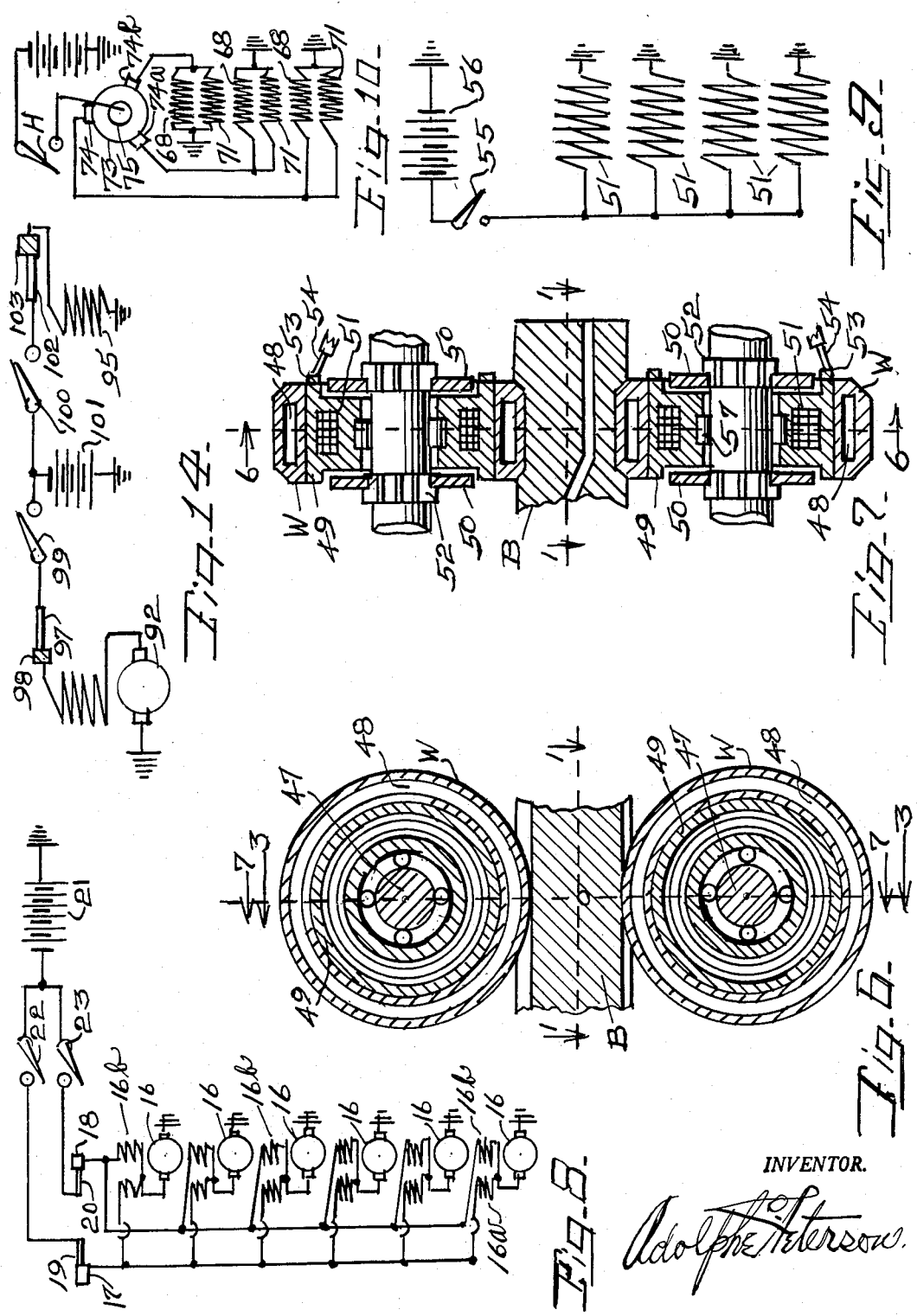

United States Patent Office 2,743,885
Patented May 1, 1956

2,743,885
ROTOR AND WING AIRCRAFT
Adolphe C. Peterson, Minneapolis, Minn.
Application May 7, 1953, Serial No. 353,481
23 Claims. (Cl. 244—7)

My invention relates to aircraft and particularly to a form of aircraft which employs a rotor means for assistance in particular times or conditions, wherefore it is called—rotor and wing aircraft.

The particular objects of my invention are to provide an aircraft which shall have the ability to travel at relatively high speed as a fixed wing aircraft and which shall also have the ability to travel slowly as a form of rotary wing aircraft; and to provide one which shall have the ability to hover in the air and to alight at very slow travel speed or relatively none at all. The ability to takeoff at relatively slow speed or in emergencies with no ground speed is also a factor. It is also the object to provide such an aircraft which shall have the advantage which the disk form of aircraft will give not only in the actual travel of the aircraft, but which will also by reason of the same disk-like form have an advantage in construction of strength, since the disk-like shape with symmetrical frame will enable construction with great strength with a minimum of weight and complication. The circular form of the disk-like aircraft which is herein described, will enable a balanced construction over all parts and sections of the aircraft and this balanced construction provides great strength with low weight. This disk-like shape will also provide the maximum of fuel carrying capacity and load carrying capacity and passenger capacity. In connection with this disk-like construction there are special devices and combinations which facilitate the construction and operation as a disk-like aircraft with the minimum of complication and expense in proportion to its ability as an aircraft for transport and other use. In general the object is to provide an aircraft of efficient form and construction and to provide one which has an especial form of rotary king as an auxiliary to the wing of fixed wing character. An object is to provide this form of aircraft and with such advantages as an improvement over the aircraft which is disclosed in my co-pending application which is entitled, Convertible Aircraft with Disk Shaped Airfoil, application Serial Number 303,788, filed August 11, 1952, now Patent No. 2,711,295.

The principal devices and combinations of devices which comprise my invention, are as hereinafter described and as defined in the appended claims. In the accompanying drawings which illustrate my invention, like characters refer to like parts throughout the several views, in so far as practicable. Referring to the drawings:

Figure 1 is a plan view of the aircraft embodying my invention, this plan view being on a scale which is approximately one-half that of Figure 2, and shows a broken away portion at one side or periphery at which there is detail illustration of some operating parts in cross section on a horizontal or nearly horizontal plane on the line 1—1 of Figure 2, the section in cross-section especially illustrating an anchorage and control means for one of the rotating air-foils or blades, others being similarly mounted.

Figure 2 is a view in vertical section on the line 2—2 of Figure 1, on a scale approximately twice that of Figure 1, illustrating particularly a cross-section vertically through the anchorage and control means for the one rotating air-foil illustrated in Figure 1, this vertical section being a vertical section substantially from the central vertical axis of the structure radially outwardly through the periphery of the structure, some parts being in full side elevation.

Figure 3 is a vertical detail cross section on the line 3—3 of Figures 1, 4, 6, through the air-craft structure adjacent to one of the sets of power engines for driving of the structure, and through that power means consisting of an upper and a lower turbine engine and drive means for the rotor, and also through the auxiliary rotor drive means mounted peripherally of the rotor, some parts in full elevation and some broken away.

Figure 4 is a detail vertical or nearly vertical section on the angling line 4—4 of Figure 3, through the longitudinal axes of the two turbine engine units and one ram-jet unit of the rotor, at one side of the aircraft, some parts in full side elevation and some diagrammatically illustrated.

Figure 5 is a vertical section on the line 5—5 of Figure 1 through one of the vertically disposed balancing jets, of which there are three, together with some adjacent structure of the aircraft, and control means not on the same line.

Figure 1:
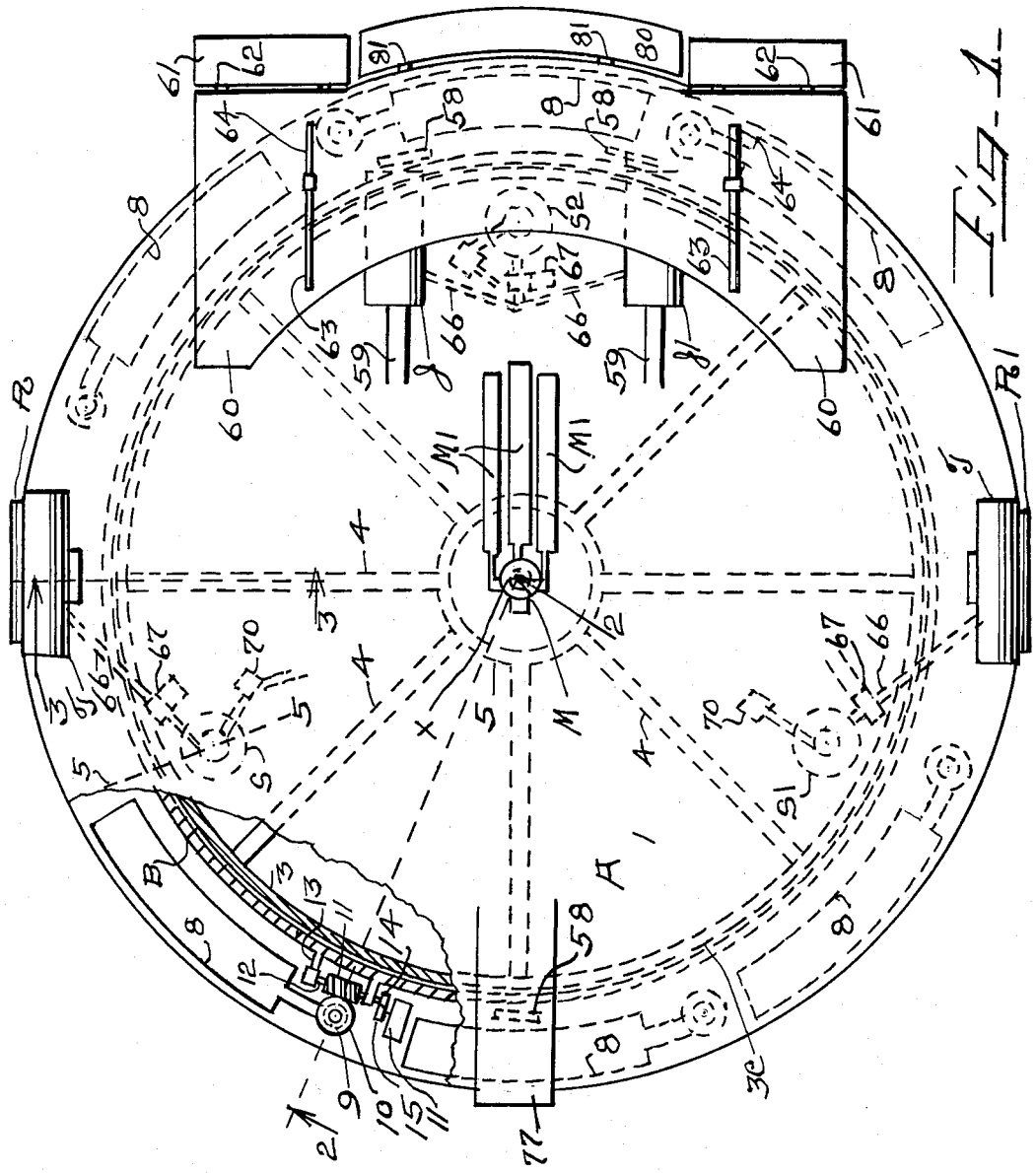

Figure 6 is a vertical section on the line 6—6 of Figures 1 and 3 and 7, through the pair of rotor driving wheels associated with the one set of turbine engines illustrated in Figure 3, this section being at right angles through theh axes of those driving wheels and on a plane through the peripheries of those driving wheels, a short broken away section of the rotor mounting rim being shown.

Figure 7 is a section at right angles to the section of Figures 6 and 4 through the axes of the driving wheels of Figure 6, parallel to those wheel axes and an adjacent section of the rotor mounting rim, and particularly illustrates clutch means for the two driving wheels illustrated.

Figure 8 is a diagrammatic illustration of the circuits through the actuating and control means for the rotor air-foils or blades.

Figure 9 is a diagrammatic illustration of the circuits controlling and effectuating the clutching for the drive wheels.

Figure 10 is a diagrammatic illustration of the circuits through and controlling the valves of the balancing jets.

Figure 11 is a view on a much reduced scale of the aircraft structure and visible elements as seen in side view. Fig. 12 is a section of blade 8.

Figures 6 and 7 are enlarged as compared with Figures 3 and 4 and Figures 3 and 4 are enlarged as compared with Figure 1. Figures 13, 14 show a modified form, of air foil swing means. Figure 15 is a modified A structure.

The fuselage structure of the aircraft embodying my invention is a structure which serves the dual purpose of a load carrying unit and also serves the purpose of the air foil wing for flight sustentation in normal flight of the aircraft, and this structure is generally designated as A in the figures, and is seen in complete plan view, in the fixed wing status for flight as a static wing for sustentation, in Figure 1 and in side view in Figure 11, the rotor air foil blades in these two views of the structure being placed in their retracted positions within the structure of the load carrying unit A so that they are not therefore in the positions for assistance in flight sustentation. The fuselage structure A has the general shape of a disk which is deep or thick enough vertically at its axis—X in Figures 1 and 2 and 11, to provide for either a cargo carrying space or passenger carrying space between the upper exterior wall 1 and the lower exterior wall 2 of the structure A. The disk-like shape of the fuselage structure tapers in thickness between the upper and lower walls 1 and 2, respectively, from the axis X towards the periphery of the disk shape. The plane through the periphery of the disk-shape is generally represented by the line 1—1 in the figures and this line 1—1 will in the flight of the aircraft be generally inclined to the horizontal with the higher part in the front of the aircraft and the lower part at the rear of the aircraft, as is illustrated by the position of the aircraft, as shown in Figure 11, which is its general position, with regard to the horizontal, in forward translational flight of the aircraft.

The fuselage structure is generally supported as a construction by a periphery member 3 which is firmly secured as a circle about the fuselage structure as its rim supporting member and this supporting member is firmly united by welding or riveting or otherwise with upper radial beams 4 radiating from a central structural circular member 5, at the upper side of the structure A, and is firmly united by welding or riveting or otherwise to the lower radial beams 6, which are at the lower side of the disk shape structure, and radiate from a central structural circular member 7. The radial members 4 are welded or riveted to circular member 5 and the radial beams 6 are welded or riveted to circular member 7, and this rigid structure formed by the beams 4, member 5, at the upper side and beams 6 member 7 at the lower side, and the periphery or rim member 3, circumferentially around the structure forms the structure of the unit A and to this structure the upper wall 1 is attached at the upper side above the beams 4 by welding or any means, and the lower wall 2 is attached at the lower side under the beams 6, by welding or any means.

The periphery or rim member 3 is formed in section through any radial section of the member, as a U laid on its side having its open side at the side, exterior to the structure A, and the legs of the U 3a and 3b are formed with and rigid with the uniting part, the vertical connecting link of the U-shape section. This U-shaped section of the periphery member 3 is as short in vertical depth as is permissible for accommodation and containment of the rotor air foils, as is hereafter described (in their retracted positions) so that this periphery member 3 thus forms the exterior periphery of the disk-shaped structure A and supports this structure at its periphery, and the upper and lower walls 1 and 2, respectively, incline towards this periphery member 3 in all directions radially outwardly from the axis X, so that the edge or periphery of the structure A will, in flight of the aircraft, present as thin an entering wedge to the atmospheric air, as is possible, and aerodynamically preferable. It should, however, be noted that this periphery member 3 may have such a form incorporated into its construction, particularly at the forward part, as is found best in use of the structure for static wing flight for sustentation of the aircraft.

The periphery member 3 by its exteriorly open sided section forms a rather large section groove or track, designated 3c which extends circumferentially of the periphery member 3 and in this groove 3c there is mounted, so as to be enabled to rotate freely therein, a periphery mounting rim or wheel member B, as generally designated, and while this member has some solid sections for strength, it is generally shaped similarly to the periphery member 3, but smaller so that it may be placed in or assembled by any jointing means (if in sections) so as to lie in and be rotatable in the circumferential groove of the periphery member 3. The groove of the mounting rim B is deep enough vertically so that there may be placed in that groove, circumferentially around it (but within), a plural number, six as illustrated, of air foil blades or air foils denoted 8, each of the latter being as long as is found most suitable for rotor sustentation of the aircraft and these air foils are formed substantially as the blades or air foils of rotor wing aircraft such as helicopters. Each air foil 8, is at its root end, mounted by a pivot or axle 9, which is perpendicular to the plane of the mounting rim B, and may be extended radially by oscillation on the pivot from the anchorage in the mounting ring B, and will be exposed to the atmospheric air in rotation of the periphery mounting ring which is generally denoted B. The description of the anchorage of the rotor air foil blade 8 in the periphery mounting ring B applies to each of the air foils or blades 8, of which there are six in the aircraft as shown, and when the rotor air foils are extended from their pivots 9, on the axes of those pivots 9, they will all lie extended at right angles from their particular location circumferentially of the mounting ring B, and will all lie substantially in the plane which is designated by the line I—I as above described, that is in a plane which is, in the position of the aircraft, as shown in Figure 11, at a slight angle to the horizontal, which angle may be say ten degrees to the horizontal or fifteen degrees or such nearly similar degree as will be the best angle of the aircraft in forward translational flight of the aircraft. In hovering or slow descent or climb, that plane may be more nearly horizontal.

Each air foil 8 is retractable into the groove circumferentially of the mounting ring B, and they are shown in the retracted positions in Figures 1 and 11, and in this position, each air foil 8 lies wholly within the groove in the mounting ring B so that none of it is exposed to atmospheric air and it has then no sustentation power. Each air foil 8 at its root end which is mounted on or fixed on the pivot 9, has formed on that root end circularly about the axis of the pivot 9, a sector of worm wheel 10 and that sector is in permanent engagement with a worm 11 formed on a shaft 12. The shaft 12 is rotatably mounted in bearings 13 fixed in the mounting ring B or formed therein, so that the worm 11 may be rotated by its attached spur gear 14 which is in engagement with the smaller spur gear 15 on the shaft of an electric motor 16. The electric motor 16 is also mounted on a bracket fixed in the groove within the mounting ring B. Each air foil 8 has this adjusting means which is just above described, and the air foils by these adjusting means and motors may all be simultaneously oscillated on the pivots 9 into the retracted positions, as they are shown in Figures 1 and 11, or they may be oscillated simultaneously in the opposite oscillation, into the active or radially extended positions, each air foil then extending substantially at right angles (in the plane of line 1—1) from the mounting ring B, that is, each air foil 8 will in that extended position extend outwardly from the mounting ring B and likewise outwardly from the periphery member 3 substantially as a radius of the circle about the axis X of the structure. In these extended positions, all the air foils 8 will be circumferentially exteriorly of the disk-shaped structure A and will be exposed to atmospheric air so that by rotation of the mounting ring B, bearing them, they will encounter the atmospheric air as air foils to effect sustentation thrust upwardly upon the structure A.

The electric motors 16 of the air foils 8, for adjusting them, are each formed with two field coil systems 16a for one direction of rotation and 16b for the reverse direction of rotation, and the coils for one direction of rotation are in parallel and the coils for the other direction of rotation are in parallel, and one of the circuits is completed by one ring contact placed on the inside of mounting ring B, and denoted 17 and the other is completed by another ring contact placed also on the inside of the mounting ring B and denoted 18, and these contacts are always in contact with contact brushes 19, 20, respectively, which are mounted in the periphery member 3, and the contact rings 17, 18 slide on the brushes. The contact brushes 19, 20 are in circuit with a battery 21 or other source of current, but there is interposed in each circuit, that for one direction of rotation, a hand switch 22, and that for the other direction of rotation, a hand switch 23.

These hand switches are normally open, but either one may be closed to effect flow of current through the associated system of field coils for one direction of rotation for adjustment one way or the other.

The mounting ring B has a plural number of ram-jet motors fixed on it, two only being shown, each denoted R, and each is attached to or formed with the mounting ring B, immediately adjacent the mounting ring outside of it and in the plane of its rotation.

Each ram-jet R, the two shown being diametrically oppositely of the mounting ring B, is formed substantially as ram-jets usually are formed and may be of any such type such as continuous flow or pulse flow, and each has, as shown (Fig. 4), generally a tubular interior having an intake 24, an intermediate section 25 somewhat of a venturi-type, an ejection or exhaust section 26, discharging to atmosphere, and each is supplied with fuel (according to its control) by gaseous fuel passing from the space interiorly of mounting ring B, between the latter and the wall of periphery member 3, adjacent to it, by way of a conduit 27 formed in mounting ring B, the gaseous fuel flowing into a fuel chamber 28 and discharging at the rear open end of chamber 28 into the air passing outside of the cylindrical wall 29 between the latter and the interior wall of the ram-jet. A spark plug or other ignition means 30, supplied with current by another contact ring 31 fixed on the inside of mounting ring B and contacted by brush 32, ignites the fuel gas to burn with air passing through the tubular sections 24, 25, 26. The space 33 between mounting ring B and the wall of periphery member 3 is supplied with fuel gas under pressure by means of a pipe 34 discharging fuel gas under pressure from a reservoir 35, as controlled by hand valve 36, or other control means. The ram-jets R, R1 are mounted in spaces intermediately of the spaces exteriorly of mounting ring B where the air foils 8 oscillate.

In Figures 1, 4, and 11, there are shown two turbine engines T and T1 (these designations also designate two other turbine engines diametrically oppositely of the structure (Figure 1)), and each of these turbine engines is mounted securely on the structure A, one on the upper side of the periphery member 3 and the other on the lower side of the periphery member 3, that is one to leg 3a and the other to leg 3b. Each turbine engine T and T1 has an axially mounted rotatable shaft 37, and on this shaft a compressor rotor 38 and a turbine rotor 39, each of these having rotor blades as customary, and the blades are rotatable between stages of compressor blades 40 and turbine blades 41, and the compressors aspirate atmospheric air from the front ends and the turbines eject exhaust gases at the rear ends through the open exhausts, in the manner of jet propulsion engines, as customarily used. Each turbine T and T1 has an annular combustion chamber 42 interposed between the compressor and turbine and fuel of any kind is supplied to the combustion chambers by fuel nozzles 43 which are in turn supplied with fuel by any pumping means not shown and fuel supply reservoirs, not shown, as turbines of the combustion type are usually supplied. Each combustion chamber has ignition means 44. Each turbine shaft 37 has fixed on it a worm 45 which is in engagement with a worm wheel 46 to drive a shaft 47, and thereby drives an associated rotor drive wheel, each of which is generally designated W. Each rotor drive wheel W, that of one turbine T above the mounting ring B and in engagement with it, and that of turbine T1 below the mounting ring B and in engagement with it, has or may have a pneumatic type rubber tire 48 (Figs. 6 and 7) mounted on a wheel disk 49 and each of the latter is engageable or disengageable from the shaft 47 associated with it by means of two friction disks 70 one on each side of wheel disk 49 and each engageable with the wheel disk 49 under attraction of electro-magnetic attraction by the wheel disk which has iron or similar magnetic material in its composition when the coil 51 placed within wheel disk 49 is excited by current flowing through it from contact ring 53 fixed on wheel disk 49 and brush 54 which is in any manner not shown on the casing outside of the wheel W. The wheel coils 51 are all under control of one hand switch 55 or other means whereby current may be passed through the coils 51 from a current source 56, Fig. 9. The wheel disks 49, when the clutch is inactive, will roll without friction on shafts by means of roller bearings 57, or the shafts will roll within them. Friction disks 50 have slidable toothed engagement 52.

The wheels W by their pneumatic tires 48 will contact the upper or lower sides of the mounting ring B, somewhat yieldably, but with some pressure of air within the tire, so that there may be good adhesion so that the wheel W may thus impart driving force to the mounting ring B to rotate it, when the clutches are engaged. There are other wheels 58, spaced circumferentially about the structure A mounted rotatably on bearings in the periphery member 3, which serve to assist in guiding the rotation of the mounting ring B, but these other wheels are not shown as being motor driven, although they may if it is found desirable, have motor rotation, as in the case of the two turbine driven wheels, as illustrated.

The structure A has at its rear side, above it (rightwardly of Figure 1), a pair of upwardly extending brackets 59 on which a rear horizontal stabilizing air foil 60 is fixed, this having horizontal balancing rudders or ailerons 61 pivotably attached to it by hinges 62, each of the ailerons having such control means (not shown) as is usually used with such horizontally disposed members for vertical direction or balancing. The stabilizing air foil 60 has also mounted on it the vertical fins or stabilizers 63 and the vertical rudders 64, each of the latter having any type of control means for their control as is customarily used in aircraft. There are mounted in the brackets 59, interposed in them, turbine jet propulsion units J and J1 and each of these has the usual turbine and compressor and air aspiration means and jet exhaust and fuel supply, as in propulsion jets, but these engines J and J1 do not, as shown, have any drive means to the mounting ring B, although they may have it if that be found desirable.

There is a balancing means for use in hovering flight or slow translational flight, which is composed of three vertically disposed jet tubes S and S1 and S2, respectively, and each of these has an open mouth at the bottom, directed vertically downwardly, and through which exhaust may be directed downwardly, as a jet, from combustion within the jet tube of fuel supplied by fuel pipe 65, and air supplied by pipes 66, each jet tube S etc. having a pipe 66 supplying air under compression to it from the associated turbine T on one side or on the other side of the structure or from the pair of jet propulsion units J and J1. The pipes 66 receive air under compression from the air chamber discharging from the air compressor to the turbine (before combustion) and this air supply is under control of valves 67 controlled by solenoids 68 and their armatures 69; and the fuel supply to each jet tube for balancing is also under control of valves 70 by solenoids 71 and their armatures 72. The current for control of the solenoids of both the air and fuel supplies to the jet tubes for balancing are under control of a contact disk 73 capable of contacting three contacts 74, 74a, 74b, according to the balancing tilt of the contact disk 73, and the latter may be under the control of the manual control lever 75 or any automatic balancing control means such as a gyroscopic device, as may be preferred. Such a gyroscopic device is well known, as used for balancing, and it is not specifically shown except as diagrammatically shown by means of the control member 75. According to this control, the turbines of the jets being under normal operation, or sufficient operation to provide air under pressure, combustion exhaust jets will be projected downwardly from the under side of the structure A, at its periphery or near that periphery, at one or the other location, of the three balancing jets, as may be necessary for balancing of the aircraft, there being no combustion and balancing jet exhaust, when not necessary.

The aircraft has an auxiliary balancing means which is provided for use, especially when the aircraft is descending, and this is a unit M which has air foil blades M1, three in number, and which is collapsible and placeable in operative condition, when found desirable, and is constructed and is operable according to the teaching of the patent issued to this applicant, under date of September 25, 1945 and which is designated as Patent Number 2,385,464 entitled, Auxiliary Autogyro Means. This balancing device or auxiliary sustentation means, is not otherwise described since it is described in that patent, and will operate as an auxiliary sustentation means for upward thrust on the upper side of the structure, when it is placed in the active condition. This auxiliary balancing unit M may have any form of power device for driving it for rotation to provide forced rotation instead of auto-gyro rotation.

The periphery member 3 has mounted in bearings in it, and spaced about the circumference, a plural number of rollers or wheels 76 which do not have any means for forcibly driving them and do not have any clutch means, such as the other wheels described, and these wheels 76 are so mounted, on vertical axes, and in light contact with the inner vertical side of the mounting rim B that they will serve as guides for the mounting rim B in rotation of the latter, keeping it in its relative location, with regard to structure A, but serving no other purpose.

The fuselage structure A has at its front section, formed on the upper side of the wall 1 protruding slightly upwardly from wall 1, a relatively narrow and short pilot's cabin 77, Figures 1 and 11, and in this cabin controls or remote control means, as commonly used, may be placed and used for control of the controllable elements constituting the aircraft.

Having described in detail the various elements constituting the device, the general use and operation is now described. It will be noted that the aircraft may have landing elements 78, which may bear landing wheels, if that be desired, and it is generally preferable that it should have such landing wheels, as it would generally be preferable that the aircraft be able to make at least a short take-off run before take-Off. In the process of starting the turbine engines the clutches of the driving wheels for the rotor may be disengaged by the means described, and likewise the air foils of the rotor mounting rim B should be placed in their retracted positions, in order that the engines may be more easily started. The pilot will now first start the turbine engines T, T1, the two at one side and the two at the other side of the structure, and he will also start the turbine jets J, J1, in operation, at idling speeds.

The pilot will now engage the clutches of the driving wheels W by closing hand switch 55 so that coils 51 are excited and the friction disks engaged with the wheel disks 49 for driving the wheels W, and he will then coincidentally control the turbines T, T1, to deliver more fuel for power thereto so that the driving power of these turbines will increase but not necessarily be at full power, and these turbines T, T1, will then deliver driving power through the wheels W to the mounting rim B to rotate the latter and the speed of the mountin grim B will reach a normal speed which speed will be that which is advisable according to the diameter of the mounting rim B, and in some constructions this speed may be say five hundred revolutions per minute and in smaller constructions, one thousand rotations per minute and in still smaller constructions, may reach as much as two thousand rotations per minute, and in this rotation the mounting rim, bearing its air foils 8, will rotate about the periphery member 3 within the groove formed in the U shape of the periphery member 3, and be guided by the driving wheels W and the locating wheels 76. The pilot may now by opening the hand valve 36 and closing the circuit to the ignition means of the ram jets R, R1 by means of brushes 32, cause the ram jets to begin operation as such ram jets. It will be noted that these ram jets are formed to direct their exhaust in opposite directions so each gives driving force to the mounting rim B. The pilot now by means of hand switch 22 or 23, the one for extension of the air foils 8, will cause the electric motors 16 of the air foils to be driven in the proper direction to cause the air foils 8 to swing outwardly on their pivots 9 and they will then assume the positions at right angles to mounting rim B, that is at right angles, substantially, to the circumference of the periphery member 3 and the structure A, so that they are in position to exert sustentation force upwardly. The outward extension radially of the air foils 8, will be assisted by the centrifugal force upon the air foils 8. Not much if any force is then necessary to extend these air foils, and the adjusting means for the air foils 8 may be so constructed, according to the inclination of the threads of the drive worms or any means used in substitution for these drive worms, that the air foils 8 will freely assume the radially extended positions, by centrifugal force, the hand switch being opened as soon as the extended positions have been attained. Full power is now given to the turbines T, T1 and also jets J, J1, and the pilot also now by his control lever 75 or any automatic substitution for the control lever control such as gyroscopic and gyroscopic servo actuated control subject to actuation by unbalancing movements of the aircraft, will cause the contacts of the balancing circuit closing means, as shown in Figure 10, to be contacted and circuit closed as needed through the individual solenoids or coils of the valve controlling means illustrated in Figure 5, so that, whenever the aircraft dips below a normal level of movement or climb according to the normal plane of movement represented by the line 1—1 of Figure 11, air will flow from a turbine compressed air chamber and fuel flow from a supply source, to the particular balancing jet chamber, such as illustrated in Figure 5, that is to jet tube S, S1, or S2, as selected by the control lever, and combustion will occur in the jet tube and gases at high speed and force will flow vertically downwardly through the downwardly projected mouth of the jet tube and this flow by its reaction upon the jet tube and the particular peripheral sector of the aircraft, will cause upward force to be exerted at that particular sector and an upward movement of the aircraft at that sector, or side, and thus balancing of the aircraft. The jet tubes S, S1, S2, are disposed at three substantially equi-distantly spaced points about the periphery of the aircraft and thus by selection of the control for the jet tubes S, S1, S2, thrust may be exerted upwardly in a selective manner to effect the balancing of the aircraft. This balancing effect is needed if the aircraft is caused to lift upwardly before a considerable speed, as necessary to cause the normal controls to be effective is attained.

As soon as a normal or cruising speed is attained, the hand switch H may be opened or any means used for discontinuing jet impulses from jet tubes S, S1, S2, and reliance for balancing in normal translational movement of the aircraft is then placed in the normal aircraft controls, namely the horizontal ailerons and the vertical rudders, 61 and 64, respectively. When a normal cruising speed or travel is attained, the turbine jets T, T1, and turbine jets J, J1, functioning as such, the pilot may by means of hand valve 36 shut off flow of fuel to ram-jets R, R1, and these then cease to function as ram-jets to drive the rotor, mounting rim B and its air foils 8, in rotation, and the pilot may then also, if not already done, cause the clutches of the drive wheels W to be disengaged, so that drive from the turbine engines T, T1, is not delivered to the drive wheels W. This drive may if desired be discontinued by declutching drive wheels W, as soon as the rotor has attained a sufficient speed for sustentation under the conditions of travel speed attained, and if the ram-jets R, R1, are proportioned for sufficient power, this would preferably be done without delay, after a short interval of operation of the drive wheels W. The normal travel of the aircraft is then accomplished by jet propulsion from the turbine engines T and T1 and the turbine jets J, J1, and under the normal travel condition, the pilot by the other hand switch 22—23 Figure 8 (both switches being then open), closes the circuit through the reverse drive of the electric motors of the air foils 8, so that then the air foils 8 are caused to move in the opposite direction of oscillation, to swing the air foils 8 back into the grooves in the mounting rim B, so that then the air foils 8 are entirely withdrawn into these grooves or sockets for them, as they are shown in Figures 1 and 11, and the air foils 8 are then ineffective for sustentation, and also present substantially no surface to atmospheric air and to cause drag upon the aircraft. Wheels W above and below mounting rim B rotate oppositely.

If now the aircraft has accomplished its journey or mission, and the pilot desires to land, or in the case of emergency, seeking a landing place in difficult conditions, such as fog, the pilot may again, after somewhat slowing the speed of travel by decreasing fuel supply to the propulsion engines, by use of the proper hand switch, Figure 8, cause current to flow to the motors for the direction of movement to cause the air foils 8 to again turn radially outwardly on their pivots 9 and they will then again turn into the radially extended positions, and the pilot may then again cause the ram-jets R, R1, to be effective to rotate the rotor first starting it in rotation by means of the clutches of wheels W, so the turbines will give starting impulse and speed to the rotor.

By use of the rotor with its air foils, the aircraft is thus again brought to ground landing. In descent the pilot again uses the jet tubes S, S1, S2, for balancing of the aircraft, and especially so, if the speed of travel is slow, and he may also if found desirable, utilize the auxiliary balancing unit M, by extension of its blades M1, as is described in the patent designated, and this auxiliary unit M will by auto-gyrotation of it and its blades, or forced rotation if that be provided, exert an upward lifting effect or sustentation on the exact central axis X of the aircraft so that this upward effect tends to balance the aircraft and to keep that upper axis center of the aircraft in its proper relative upward position, so the aircraft descends and lands upon a relatively even keel or bottom. In climb or in descent, when the aircraft travels relatively slowly or not at all in translational flight, the mounting rim B with its air foils 8, are traveling in rotation about the load carrying structure A at high speed, and at this high speed of rotation, there is a certain gyroscopic effect upon the aircraft of rather strong action and this effect will exert a strong balancing effect upon the aircraft so that the need for use of the balancing jets described is relatively small and will readily accomplish that function, and that balancing function is also, when unit M is utilized, assisted thereby.

The mounting rim, which may otherwise be called a mounting ring is provided with packing rings of any soft and non-frictional material, or any other means to prevent any loss of the gas fuel for the ram-jets during the brief intervals when the ram-jets are in operation as such. It may be noted, however, that I contemplate that other methods and means for supplying fuel for the ram jets R, R1, may be provided. The packing material is designated N. It will be seen in Figure 1, that the air foils 8 have a slightly curved shape in their longitudinal plan aspect, and this is in order that the air foils 8 may in the retracted positions lie within the slightly curved groove or space provided for them within the mounting rim B. It may be preferable in some constructions to have a larger number of the air foils, than six, spaced about the mounting rim B.

The load carrying space, for cargo, or for passengers, is designated L in Figure 2, half of this load carrying space being there shown, the other half being similar. This load carrying space L may be subdivided as may be found necessary or convenient, and there may be posts 79 secured vertically between the beam members 4 and 6 of the structure A so as to give rigidity to the structure. At the rear end of the stabilizing air foil 60 there is mounted by hinges 81 the elevator rudder 80 for elevational control of the aircraft in normal flight. This rudder 80, as well as the members 61 and 64, are controlled in any manner, by any of the commonly used means for control of such directional control means, and such means is therefore not specifically shown. While Figures 1, 2, and 11, show merely a small pilot's cabin 77, it may be understood that this pilot cabin may be extended rearwardly of the structure A as long as desired, not exceeding the length of the diameter of structure A, but in any case, it would be relatively narrow in transverse cross section, in order not to unduly interfere with the general conformation of the disk-like structure A. The structure A may be formed somewhat as shown in Figure 15, which shows the structure having an upper wall 1 of the general shape as in Figures 1, 2, 11, but as having a lower wall structure 2 as relatively flat. This structure, as illustrated in Figure 15, is otherwise like that shown in the other figures.

Referring now to Figures 13 and 14, which show a modified form of control and actuating means for the oscillative air foils 8, this modified structure has the annular wall 3, only a short sector thereof being shown, and has the annular mounting ring B, only a similarly short sector thereof being shown. Each air foil 8 is mounted in this ring B on a pivot 9, to be oscillative on the latter, as in the case of the first form shown. Each air foil 8 has a crank arm 82 fixed on or formed with the air foil, extending horizontally from the pivot mounting in the same plane as the plane of oscillation of the air foil 8. This crank arm 82 is connected by a pivotably connected link 83, to the rod 84 of the piston 85, the piston 85 being reciprocable in a cylinder 86 formed in the mounting ring B or securely attached to the mounting ring B, in such manner that the piston 85 may reciprocate tangentially of the circumference of the circle formed by the mounting ring B, and may thus when moved outwardly in cylinder 86 exert thrust against crank arm 82 to cause the air foil 8 (blade) to swing about its pivot 9, into the retracted or inactive position, within the annular groove within mounting ring B. Since the mounting ring B is always rotated to place it in operating condition, the exertion of centrifugal force on the air foils 8 will cause them to swing outwardly on their pivots 9, to the radially extended positions, the pressure within cylinder 86 being then released.

The bore of cylinder 86 behind the piston 85, is connected by a short conduit or port 87 with an annular conduit 88 which is formed in mounting ring B or constructed in any manner therewith and extends annularly around the mounting ring B so that it may form a conduit connecting with all the bores of cylinders 86 of all air foils 8, six in case there are six air foils 8. The annular conduit or common conduit 88 receives air or gaseous fluid or an hydraulic fluid as oil, and may return the same fluid, by way of a short conduit 89 connecting the annular conduit 88 with the one side of a pump 90 whose operating shaft 91 is driven by an electric motor 92. The pump 90 is of a type which is reversible such as a Rootes blower type or a gear type pump having two gears, as commonly known, or any vane type pump, such as may be reversible and operate one way as a pump to pump the fluid to the annular conduit 88, and may be operative the other way to release the fluid from annular conduit 88 and cylinders 86. A valve means 93 has a valve piston 94 slidable therein and the latter is controllable to move the valve piston 94 by a solenoid 95 and solenoid armature 96, the valve being returnable by any spring means (not shown) contained within the solenoid structure 96.

There is only one such pump 90 with its control by solenoid 95 and valve piston 94, and by this means fluid as air or hydraulic fluid, is pumped under pressure through common conduit 88 to cylinders 86 to force pistons 85 outwardly to force crank arms 82 and all air foils 8, simultaneously into their retracted, inactive, positions, within the annular mounting groove within mounting ring B. The current to drive motor 92 is conducted by a contact brush 97 fixed in wall 3 and on which contact ring 98 annularly within mounting ring B slides. A hand switch 99 permits the pilot to close this circuit through motor 92 to cause the retraction action, and a hand switch 100 permits the pilot to close a circuit from battery 101 through another contact brush 102 and annular contact ring 103 through solenoid 95 to cause the latter to be activated when he desires to release fluid from cylinders 86, that is when he desires to place the air foils 8 in the operative condition, extended radially. A port 104 shown by dotted lines only, in the valve piston 94 permits fluid to flow outwardly, when the valve piston is pulled outwardly. This valve piston 94 must also be pulled outwardly when the pilot desires to force fluid to cylinders 86 to cause retraction of the air foils 8. But normally this valve piston 94 closes the exhaust or induction pipe 105. The latter may draw or release air to atmosphere, or to or from any gaseous fluid reservoir (not shown), carried on mounting ring B, or to or from any hydraulic fluid reservoir carried on mounting ring B and not shown. Since the apparatus would be lighter with use of air for this purpose, the pipe 105 is shown as merely open to atmosphere.

While I have shown particular devices and combinations of devices in the illustration of my invention, I contemplate that other detailed devices and combinations of devices, may be used in realization of my invention, without departing from the spirit and contemplation thereof.

What I claim is:

1. In an aircraft, a rotor carrying air foil unit having an upper sheathing wall exposed on the upper surface to the ambient air in flight and a lower sheathing wall exposed on its under surface to the ambient air in flight and an intermediate framing structure to which said sheathing walls are attached, the said air foil unit having a circular plan form and of large diameter relative to its depth transversely of said plan form; an annular mounting race formed circumferentially of said intermediate framing structure and substantially in the plane of the circumferential periphery of said air foil unit; an annular mounting ring and a bearing mounting for the mounting ring formed on the said annular mounting race for rotation of the mounting ring about the said annular mounting race as a support therefor in rotation; a plural number of air foils spaced about the mounting ring and each having anchorage at its root end in the mounting ring, the anchorage of each air foil including a pivot on an axis substantially transversely and vertically of the plane of the mounting ring on which the air foil is oscillative substantially in the plane of rotation of the mounting ring to place it alternatively in a retracted position between the said upper and lower sheathing walls, and within the external circumferential periphery of the said air foil unit, or in a position extended substantially radially outwardly from the said air foil unit.

2. All the means as described and as claimed in claim 1 and in combination therewith a torque developing power means to provide a rotational impulsion to the mounting ring for rotation of the mounting ring and its air foils on its bearing mounting on the said annular mounting race.

3. All the means as described and as claimed in claim 1 and in combination therewith a motor means carried on the mounting ring and torque transmitting means between the motor means and the air foils to transmit torque to the air foils to swing the air foils on their pivots in the mounting ring.

4. All the means as described and as claimed in claim 1 and in combination; a motor means carried on the mounting ring and torque transmitting means between the motor means and the air foils to transmit torque to the air foils to swing the air foils on their pivots in the mounting ring, and control means for the motor means; and a plural number of thrust imparting stabilizing means spaced about the said air foil unit to impart vertical stabilizing thrust to the air foil unit by any one of said thrust imparting stabilizing means.

5. All of the means as described and as claimed in claim 1 and in combination; a motor means carried on the mounting ring and torque transmitting means between the motor means and the air foils to transmit torque to the air foils to swing the air foils on their pivots in the mounting ring, and control means for the motor means; and a plural number of thrust imparting stabilizing means spaced about the annular air-foil unit to impart thrust vertically to the air foil unit by any one of said thrust imparting stabilizing means; and a propulsion engine means mounted on the air-foil unit to provide translational propulsion for the air foil unit in flight and directional control means carried on the air-foil unit for directional impulsion of the aircraft in translational flight.

6. All the means as described and as claimed in claim 1 and in combination; jet expulsion developing means mounted on the mounting ring to provide tangential thrust for rotation of the mounting ring on its bearing mounting on the said annular mounting race; and power propulsion means carried on the said air-foil unit for developing thrust for translational propulsion in flight, and means operative between the last named power propulsion means and the mounting ring to transmit driving torque for rotation of the mounting ring on its bearing mounting on the said annular mounting race.

7. All the means as described and as claimed in claim 1 and in combination; power propulsion means carried on the said air-foil unit for developing thrust for translational flight of the aircraft; jet expulsion thrust developing means mounted on the mounting ring to impart tangential thrust to the mounting ring for its rotation, and balancing jet expulsion thrust developing means spaced peripherally about the said air-foil unit expelling vertically downwardly to impart selectively balancing thrust by any one of said last named means, and means supplying air under pressure from the power propulsion means to the last named balancing jet expulsion means selectively, and means to supply fuel with the air for combustion.

8. In an aircraft, a rotor carrying air foil unit having an upper sheathing wall exposed on its upper surface to the ambient air in flight and a lower sheathing wall exposed on the under surface to the ambient air in flight and an intermediate framing structure to which said sheathing walls are attached, the said air foil unit having a circular plan-form and of large diameter relative to its depth transversely of said plan form; an annular mounting race formed circumferentially of said intermediate framing structure and substantially in the plane of the circumferential periphery of said air foil unit; an annular mounting ring and a bearing mounting for the mounting ring peripherally of the said annular mounting race for rotation of the mounting ring about the said annular mounting race as a support therefor in rotation; a plural number of air foils spaced about the mounting ring and each having anchorage at its root end in the mounting ring, the anchorage of each air foil including a pivot on an axis substantially transversely and vertically of the plane of the mounting ring and on which the air foil is oscillative substantially in the plane of rotation of the mounting ring to place it alternatively in a retracted position within the circumferential periphery of said air foil unit or in a position extended substantially radially outwardly from the said air foil unit.

9. All of the means as described and as claimed in claim 8 and in combination; a motor means carried on the mounting ring and torque transmitting means between the motor means and the air foils to transmit torque to the air foils to swing the air foils on their pivots in the mounting ring.

10. All of the means as described and as claimed in claim 8 and in combination; jet propulsion developing means mounted on the mounting ring to provide tangential thrust for rotation of the mounting ring on its bearing mounting on the said annular mounting race, and power propulsion means carried on the said air foil unit for developing thrust for translational impulsion of the aircraft in flight; and means operative between the last named power propulsion means and the mounting ring to transmit driving torque for rotation of the mounting ring on its bearing.

11. All of the means as described and as claimed in claim 8 and in combination; power propulsion means carried on the said air foil unit for developing thrust for translational flight of the aircraft; jet expulsion thrust developing means mounted on the mounting ring to impart tangential thrust to the mounting ring for its rotation; balancing jet expulsion thrust developing means spaced peripherally about the said air foil unit expelling vertically downwardly to impart selectively balancing thrust at either of the spaced locations; and means supplying air under pressure from the power propulsion means to the last named balancing jet expulsion means selectively and means to supply fuel with the air for combustion.

12. All of the means as described and as claimed in claim 8 and in combination; a motor means carried on the mounting ring, the said motor means including for each air foil an associated motor having a driving element and interengaging transmitting means between the driving element and the air foil connecting the driving element and the air foil to swing the air foil on its pivot in the mounting ring.

13. All of the means as described and as claimed in claim 8 and in combination; a motor means carried on the mounting ring and torque transmitting means between the motor means and the air foils to transmit torque to the air foils to swing the air foils on their pivots in the mounting ring, the said motor means and torque transmitting means including for each air foil an associated motor having a driving element and transmitting means between the driving element and the air foil connecting the one with the other to swing the air foil on its pivot in the mounting ring, and a control means to supply an operative agent to all of the motor means to effect a like swing movement of the air foils on their said pivots.

14. All of the means as described and as claimed in claim 8 and in combination; a plural number of electric motors one adjacent to and associated with the pivot of each air foil, each electric motor having a drive shaft, each said drive shaft operatively connected with the air foil adjacent its pivot to transmit torque from the said drive shaft to the air foil to swing the air foil on its pivot, conducting means between the mounting ring and the said air foil unit connecting each electric motor through a control means therefor to a current source, the last named control means including means to change the driving torque to the air foil to change the direction of the swing about its pivot.

15. All of the means as described and as claimed in claim 8 and in combination; a plural number of fluid operated motor means each adjacent to and associated with the pivot of one air foil and each having a pressure operated piston element in operative connection with the air foil to swing the air foil on its pivot, a fluid pumping means mounted on the mounting ring and connected by a conduit formed on the mounting ring between the pumping means and the fluid operated motor means, and a conduit from the pumping means to admit or discharge a fluid from the pumping means, and a control for the pumping means to procure operation to pump fluid under pressure to the fluid operated motor means and alternatively to procure release of fluid from the fluid operated motor means, the air foils by the last named control being subject to control for procurance of the retracted inactive positions of the air foils or alternatively the radially extended positions for actuation as air foils.

16. All of the means as described and as claimed in claim 1 and in combination; a propulsion engine means mounted on the said air foil unit, the last named engine means having means for translational propulsion of the aircraft, and the said last named propulsion engine means having a rotatable driven element and a driving wheel means connected operatively with the rotatable driven element; the said driving wheel means having driving engagement with the said mounting ring to impart driving torque for rotation of the mounting ring on its bearing mounting; and jet expulsion thrust means mounted on the mounting ring, the said last named means having fuel supply means therefor to supply fuel for combustion in said jet expulsion thrust means.

17. In an aircraft, a relatively static air foil rotor carrying unit, embodying an upper sheathing wall circular in plan form and exposed to the ambient air on its upper surface and a lower sheathing wall circular in planform and exposed to the ambient air on its under surface; an internal structural frame intermediately of said sheathing walls and to which the said upper and lower sheathing walls are secured and spaced apart one above the other so that their perimeters are substantially parallel to each other and relatively closely adjacent said perimeters; a rotor bearing race formed to lie substantially parallel to said perimeters and intermediately of said sheathing walls and secured to said internal structural frame; a rotor ring mounted on said bearing race to be rotatable thereon as a bearing and substantially in the plane of said bearing race; pivot bearing members secured to said rotor ring at locations substantially equidistantly spaced circumferentially of said rotor ring; air foil members each having a pivot mounting at one of its ends in one of said pivot bearing members to be oscillative in the plane of the circumference of said rotor ring on an axis substantially at right angles to and vertically transversely of said plane, alternatively, to one position in which the said air foil member is extended radially outwardly in said plane from said rotor ring and from said rotor carrying unit, or to a position in which the said air foil member is retracted to be stationed substantially in the said plane and closely abutting an associated section of the perimeter of said rotor carrying unit.

18. In aircraft, an air foil rotor carrying unit circular in plan form; an annular mounting race fixed circumferentially of said rotor carrying unit to be as to its circumference substantially in the plane of the perimeter of said rotor carrying unit; an annular mounting ring having a bearing mounting for rotation on said mounting race to be rotatable substantially in said plane; a plural number of air foil mounting bearings fixed to said mounting ring and spaced equi-distantly circumferentially thereof; a plural number of air foil members each air foil member having anchorage at one of its ends in said mounting ring on a pivot in one of said air foil mounting bearings to be oscillative on said pivot on an axis substantially perpendicular to said plane and to be oscillative in said plane, alternatively, to one position radially extended from said mounting ring and from said rotor carrying unit, or to a position retracted within the circumferential boundary of said annular mounting ring.

19. All of the means as described and as claimed in claim 18, and in combination; a circumferential recess within said ring and in said plane into which said air foil members are deposited in their said retracted positions.

20. In aircraft, an air foil rotor carrying unit having an upper sheathing wall and a lower sheathing wall and an intermediate framing structure to which said upper and lower sheathing walls are secured and spaced apart one above the other and so that their perimeters are substantially parallel to each other and relatively closely adjacent; the said upper and lower sheathing walls forming a unified means capable in translational flight to effect upward sustentation thrust; an annular mounting race fixed circumferentially of said intermediate framing structure to be as to its perimeter substantially in the same plane as the perimeter of said unified means formed by said upper and lower sheathing walls; an annular rotor ring having a bearing mounting for rotation on said mounting race to be rotatable substantially in said plane; a plural number of mounting bearings fixed to said rotor ring and spaced equi-distantly circumferentially thereof; a plural number of air foil members each air foil member having anchorage at one end on a pivot in an associated one of said mounting bearings to be oscillative on an axis substantially perpendicular to said plane and in said plane, alternatively, to one position radially extended from said rotor ring and from said rotor carrying unit and in said plane, or to a retracted position substantially in the said plane and within the circumferential boundary of said rotor carrying unit.

21. All of the means as stated and as claimed in claim 20, and in combination; a circumferential recess within said ring and in said plane into which said air foil members are deposited in their said retracted position.

22. All of the means as described and as claimed in claim 20, and in combination; a torque developing power means to provide a rotational impulsion to the said annular rotor ring and its interconnected air foil members for rotation of the said rotor ring and its said air foil members as a unit about the said annular mounting race.

23. All of the means as stated and as claimed in claim 20, and in combination; a motor means carried on the said rotor ring and torque transmitting means between the said motor means and the said air foil members to transmit torque to the said air foil members to swing the said members on their said pivots in the rotor ring.

References Cited in the file of this patent

UNITED STATES PATENTS

| | | |
|---|---|---|
| 2,521,684 | Bates | Sept. 12, 1950 |

FOREIGN PATENTS

| | | |
|---|---|---|
| 321,642 | Italy | Oct. 11, 1934 |
| 405,295 | Italy | Aug. 3, 1943 |
| 610,143 | Great Britain | Oct. 12, 1948 |
| 1,018,071 | France | Oct. 8, 1952 |
| 1,018,196 | France | Oct. 8, 1952 |